US012722187B2

(12) United States Patent
Kakinuma

(10) Patent No.: US 12,722,187 B2
(45) Date of Patent: Sep. 1, 2026

(54) PROCESSING APPARATUS

(71) Applicant: DISCO CORPORATION, Tokyo (JP)

(72) Inventor: Yoshinori Kakinuma, Tokyo (JP)

(73) Assignee: DISCO CORPORATION, Tokyo (JP)

( * ) Notice: Subject to any disclaimer, the term of this patent is extended or adjusted under 35 U.S.C. 154(b) by 357 days.

(21) Appl. No.: 17/822,020

(22) Filed: Aug. 24, 2022

(65) Prior Publication Data

US 2023/0076401 A1 Mar. 9, 2023

(30) Foreign Application Priority Data

Sep. 7, 2021 (JP) ................................ 2021-145808

(51) Int. Cl.
*B08B 5/02* (2006.01)
*B08B 17/02* (2006.01)
*B24B 1/00* (2006.01)

(52) U.S. Cl.
CPC ................ *B08B 5/02* (2013.01); *B08B 17/02* (2013.01); *B24B 1/00* (2013.01)

(58) Field of Classification Search
CPC .. B08B 5/02; B08B 17/02; B24B 1/00; B24B 53/007; B24B 37/04; B24B 37/042; B24B 37/10; B24B 37/34; B24B 37/345; B24B 51/00; B24B 41/005; B24B 47/22; B24B 27/0007; B24B 27/0015; B24B 27/003; B24B 27/0023; B24B 27/0038; H01L 21/6836; H01L 2221/68327
USPC ........................................................... 269/21
See application file for complete search history.

(56) References Cited

U.S. PATENT DOCUMENTS 3,729,206 A * 4/1973 Cachon ................. B25B 11/005
269/21

FOREIGN PATENT DOCUMENTS

| | | | |
|---|---|---|---|
| JP | 2008147505 A | | 6/2008 |
| JP | 2016025219 A | | 2/2016 |
| JP | 3210743 U | * | 6/2017 |
| JP | 2018078208 A | * | 5/2018 |

OTHER PUBLICATIONS

Office Action issued in counterpart Taiwanese Patent Application No. 111133391, dated Jul. 28, 2025.

* cited by examiner

*Primary Examiner* — Monica S Carter
*Assistant Examiner* — Caleb Andrew Holizna
(74) *Attorney, Agent, or Firm* — GREER BURNS & CRAIN, LTD.

(57) ABSTRACT

A processing apparatus includes a chuck table having a holding surface for holding a plate-shaped workpiece thereon, a processing unit for processing the plate-shaped workpiece held on the chuck table, a delivery unit for selectively delivering the plate-shaped workpiece onto and from the chuck table, and a control unit for controlling the chuck table, the processing unit, and the delivery unit. The chuck table includes a gas ejection port defined in or around the holding surface and connected to a gas supply system. While the plate-shaped workpiece is not placed on the holding surface, the control unit controls the gas supply system to eject a gas from the gas ejection port to form a protective layer of the gas over the holding surface, thereby preventing foreign matter from being deposited on the holding surface.

8 Claims, 3 Drawing Sheets

PROCESSING APPARATUS

BACKGROUND OF THE INVENTION

Field of the Invention

The present invention relates to a processing apparatus for processing a plate-shaped workpiece.

Description of the Related Art

When various plate-shaped workpieces such as semiconductor wafers, resin-packaged substrates, or ceramic substrates are to be divided into individual chips or thinned down by grinding, in order to protect face sides of the workpieces, resin-made dicing tapes or sheets are affixed to the workpieces, or resin-made protective layers are formed from liquid resin on the workpieces. For example, a sheet is pressed against and affixed to an exposed surface of a plate-shaped workpiece that is being held on a holding surface of a chuck table. If foreign matter remains deposited on the holding surface of the chuck table, the foreign matter may be transferred to the surface of the workpiece on the chuck table or may cause damage to the workpiece when the sheet is pressed against the workpiece. In view of these problems, it has been known in the art to provide a processing unit with a cleaning unit for periodically cleaning the holding surface of the chuck table (see, for example, JP 2008-147505A).

SUMMARY OF THE INVENTION

However, the cleaning unit poses its own problems in that it incurs installation costs and needs to be cleaned in itself.

It is therefore an object of the present invention to provide a processing apparatus that is capable of protecting a holding surface of a chuck table from the deposition of foreign matter thereon without the need for an additional cleaning unit.

In accordance with an aspect of the present invention, there is provided a processing apparatus including a chuck table having a holding surface for holding a plate-shaped workpiece thereon, a processing unit for processing the plate-shaped workpiece held on the chuck table, a delivery unit for selectively delivering the plate-shaped workpiece onto and from the chuck table, and a control unit for controlling the chuck table, the processing unit, and the delivery unit. The chuck table includes a gas ejection port defined in or around the holding surface and connected to a gas supply system. While the plate-shaped workpiece is not placed on the holding surface, the control unit controls the gas supply system to eject a gas from the gas ejection port to form a protective layer of the gas over the holding surface, thereby preventing foreign matter from being deposited on the holding surface.

Preferably, the processing unit includes a sheet affixing unit for affixing a sheet to the plate-shaped workpiece held on the chuck table.

The processing apparatus according to the aspect of the present invention is capable of protecting the holding surface of the chuck table against the deposition of foreign matter thereon without the need for an additional cleaning unit.

The above and other objects, features and advantages of the present invention and the manner of realizing them will become more apparent, and the invention itself will best be understood from a study of the following description and appended claims with reference to the attached drawings showing some preferred embodiments of the invention.

DETAILED DESCRIPTION OF THE PREFERRED EMBODIMENTS

Figure 1:
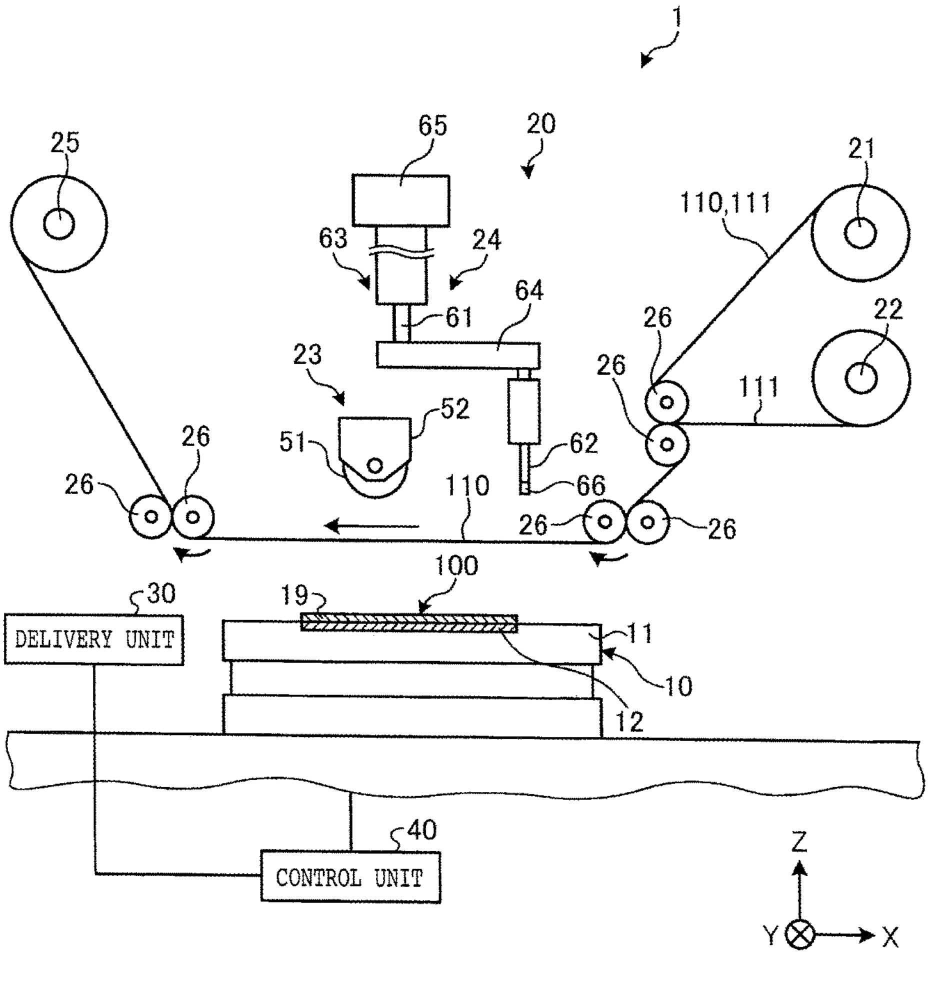
FIG. 1 is a cross-sectional view, partly in block form, illustrating a structural example of a processing apparatus according to a first embodiment of the present invention.

Preferred embodiments of the present invention will be described in detail hereinbelow with reference to the accompanying drawings. The present invention is not limited to the details of the embodiments described below. The components described below cover those which could easily be anticipated by those skilled in the art and those which are essentially identical to those described above. Further, the arrangements described below can be combined in appropriate manners. Various omissions, replacements, or changes of the arrangements may be made without departing from the scope of the present invention. In the description to be described below, those components that are identical to each other are denoted by identical reference characters.

First Embodiment

Figure 2:
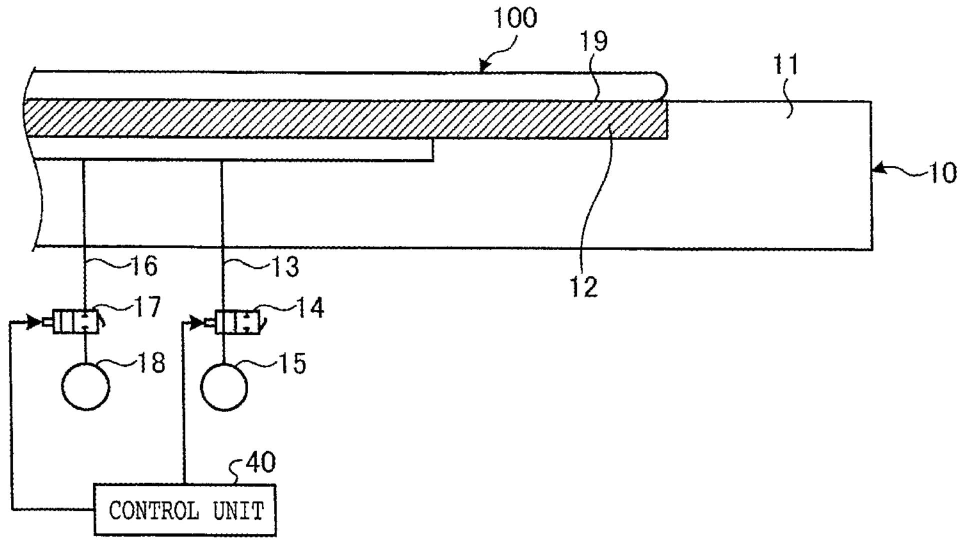
FIG. 2 is a fragmentary cross-sectional view illustrating a central portion of the processing apparatus illustrated in FIG. 1.
Figure 3:
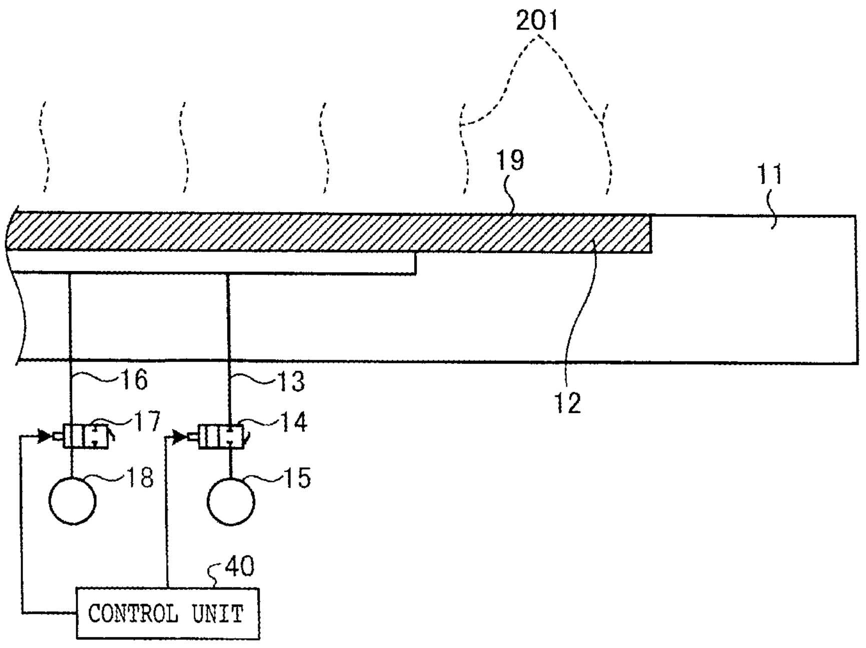
FIG. 3 is a fragmentary cross-sectional view illustrating the central portion of the processing apparatus illustrated in FIG. 1.

A processing apparatus 1 according to a first embodiment of the present invention will be described hereinbelow with reference to FIGS. 1 through 3. FIG. 1 illustrates in cross section, partly in block form, the processing apparatus 1 according to the first embodiment. FIGS. 2 and 3 illustrate in fragmentary cross section, partly in block form, a central portion of the processing apparatus 1. As illustrated in FIG. 1, the processing apparatus 1 includes a chuck table 10, a processing unit 20, a delivery unit 30, and a control unit 40. In FIG. 1, X-axis directions along an X-axis, i.e., forward and rearward directions, Y-axis directions along a Y-axis, i.e., leftward and rightward directions, and Z-axis directions along a Z-axis, i.e., upward and downward directions, extend perpendicularly to each other.

According to the first embodiment, a plate-shaped workpiece 100 as a target object to be processed by the processing unit 20 of the processing apparatus 1 is, for example, a semiconductor device wafer or optical device wafer shaped as a circular plate made of a base material such as silicon, sapphire, silicon carbide (SiC), or gallium arsenide. The plate-shaped workpiece 100 may have or may not have a plurality of projected dicing lines and devices formed on a face side thereof. According to the present invention, the plate-shaped workpiece 100 is not limited to such wafers and may be a rectangular packaged substrate, ceramic plate, glass plate, or the like having a plurality of resin-encapsulated devices.

As illustrated in FIG. 1, the chuck table 10 includes a disk-shaped frame 11 with a cavity defined in an upper surface thereof and a disk-shaped suction member 12 fitted in the cavity in the frame 11. The suction member 12 is made of porous ceramic or the like. The porous ceramic of the suction member 12 has a multiplicity of minute pores intrinsically defined as air gaps or gas ejection ports therein. According to the first embodiment, as illustrated in FIGS. 2 and 3, the suction member 12 is fluidly connected to a suction source 15 through a vacuum suction channel 13 extending downwardly from the cavity in the frame 11 and an on/off valve 14 connected to the vacuum suction channel 13. When the processing apparatus 1 is in operation, the suction member 12 holds the plate-shaped workpiece 100 thereon under a negative pressure transmitted from the suction source 15 via the vacuum suction channel 13 to the suction member 12. The suction member 12 is also fluidly connected to a gas supply source 18 through a gas ejection channel 16 extending downwardly from the cavity in the frame 11 and an on/off valve 17 connected to the gas supply source 18. The gas supply source 18 supplies a gas 201 (see FIG. 3) such as compressed air or a compressed inactive gas, for example.

According to the present invention, the chuck table 10 is not limited to the porous chuck table including the suction member 12 made of porous ceramic or the like. Instead, the chuck table 10 may have, in an area for holding the plate-shaped workpiece 100 thereon, a plurality of suction holes fluidly connected to the suction source 15 through the vacuum suction channel 13 and the on/off valve 14 and a plurality of gas ejection holes fluidly connected to the gas supply source 18 through the gas ejection channel 16 and the on/off valve 17.

The suction member 12 of the chuck table 10 has an upper surface functioning as a holding surface 19 for holding the plate-shaped workpiece 100 placed thereon under the negative pressure transmitted from the suction source 15 via the vacuum suction channel 13. The holding surface 19 lies flush with an upper surface of the frame 11 of the chuck table 10, and extends parallel to a horizontal plane defined by the X-axis and the Y-axis. The chuck table 10 is movable in X-axis directions, i.e., horizontal directions, by an X-axis moving unit, not illustrated, and is also rotatable by a rotary actuator, not illustrated, about a central axis thereof that extends parallel to Z-axis directions, i.e., vertical directions, perpendicular to the holding surface 19.

According to the first embodiment, the processing unit 20 is vertically movable along the Z-axis directions by a Z-axis moving unit, not illustrated. The chuck table 10 has an annular groove, not illustrated, defined in the upper surface of the frame 11 and having a diameter that is the same as the diameter of the plate-shaped workpiece 100. The annular groove is positioned in alignment with a circular path along which a cutting edge 66 of a cutter blade 62 of the processing unit 20 to be described below. The annular groove functions as a clearance groove for allowing the cutting edge 66 to be inserted therein.

The processing unit 20 performs some processing such as cutting, grinding, or polishing on the plate-shaped workpiece 100 held on the chuck table 10. More specifically, the processing unit 20 affixes a sheet 110 to a surface of the plate-shaped workpiece 100, forms a protective layer on a surface of the plate-shaped workpiece 100 by supplying a resin thereto, cuts, grinds, and polishes the plate-shaped workpiece 100, processes the plate-shaped workpiece 100 with a laser beam, processes the plate-shaped workpiece 100 with a plasma gas, or cleans the plate-shaped workpiece 100, for example.

In other words, the processing unit 20 is, for example, a sheet affixing unit for affixing a sheet 110 to a surface of the plate-shaped workpiece 100, a protective layer forming unit for forming a protective layer on a surface of the plate-shaped workpiece 100 by supplying a resin thereto, a cutting unit for cutting the plate-shaped workpiece 100 with a cutting blade mounted on a distal end of a spindle, a grinding unit for grinding the plate-shaped workpiece 100 with a grinding wheel mounted on a distal end of a spindle, a polishing unit for polishing the plate-shaped workpiece 100 with a polishing pad mounted on a distal end of a spindle, a laser processing unit for processing the plate-shaped workpiece 100 with a laser beam emitted from a laser beam applying unit, a plasma processing unit for processing the plate-shaped workpiece 100 with a plasma gas supplied from a gas supply unit, a cleaning unit for cleaning the plate-shaped workpiece 100 with a cleaning liquid supplied from a cleaning liquid nozzle, or the like.

According to the first embodiment, the processing unit 20 is a sheet affixing unit for affixing a sheet 110 to a face side or reverse side of the plate-shaped workpiece 100 held on the chuck table 10. As illustrated in FIG. 1, the processing unit 20 includes an uncoiler unit 21, a peel-off sheet take-up unit 22, an affixing unit 23, a sheet cutting unit 24, a sheet take-up unit 25, and a plurality of feed rollers 26.

The sheet 110 to be affixed to the plate-shaped workpiece 100 by the processing unit 20 according to the first embodiment includes a sticky layer and a base layer, for example. The sticky layer is made of a sticky synthetic resin that will stick to the surface of the plate-shaped workpiece 100 to which the sheet 110 is to be affixed. The sticky layer is stacked on one surface of the base layer. The base layer is made of a synthetic resin. The sheet 110 is an elongate sheet wound in a roll with a peel-off sheet 111 affixed to the sticky layer, the peel-off sheet 111 being for protecting the sticky layer. According to the first embodiment, the sheet 110 is wound in a roll such that the peel-off sheet 111 is positioned radially inwardly of the sheet 110. According to the first embodiment, the processing unit 20 progressively peels off the peel-off sheet 111 from the sheet 110, affixes the sheet 110 to the surface of the plate-shaped workpiece 100, and cuts the sheet 110 along the outer edge of the plate-shaped workpiece 100.

The uncoiler unit 21 pays out the sheet 110 from the roll progressively from its end onto the holding surface 19 of the chuck table 10. According to the first embodiment, the uncoiler unit 21 is spaced from the chuck table 10 in one of the X-axis directions, i.e., in the rightward direction in FIG. 1, and disposed upwardly of the chuck table 10. The uncoiler unit 21 is of a cylindrical shape whose central axis extends parallel to Y-axis directions, and is rotatable about its central axis. The uncoiler unit 21 includes a tubular core on which the roll of the sheet 110 is set to allow the sheet 110 to be paid out from the roll.

The peel-off sheet take-up unit 22 winds up thereon the peel-off sheet 111 peeled off from the sheet 110 that is paid out from the roll on the uncoiler unit 21. According to the first embodiment, the peel-off sheet take-up unit 22 is disposed beneath the uncoiler unit 21. The peel-off sheet take-up unit 22 is of a cylindrical shape whose central axis extends parallel to Y-axis directions, and is rotatable about its central axis by a rotary actuator such as an electric motor, not illustrated, to wind the peel-off sheet 111 peeled off from the sheet 110 on its outer circumferential surface.

The affixing unit 23 affixes the sheet 110 supplied from the uncoiler unit 21 onto the holding surface 19 of the chuck table 10, to the plate-shaped workpiece 100 held under suction on the holding surface 19. The affixing unit 23 is disposed above the holding surface 19 of the chuck table 10.

The affixing unit 23 includes an affixing roller 51 and a roller support member 52. The affixing roller 51 is of a cylindrical shape whose central axis extends parallel to Y-axis directions. On the roller support member 52, the affixing roller 51 is rotatably supported for rotation about the central axis thereof. The roller support member 52 is movable in X-axis directions and Z-axis directions by a moving mechanism, not illustrated. The affixing unit 23 affixes the sheet 110 to the plate-shaped workpiece 100 held under suction on the holding surface 19, when the affixing unit 23 that has been lowered in one of the Z-axis directions is moved in one of the X-axis directions by the moving mechanism.

After the sheet 110 has been affixed to the plate-shaped workpiece 100, the sheet cutting unit 24 cuts off an excess portion of the sheet 110 that protrudes from the outer edge of the plate-shaped workpiece 100, so that a portion of the sheet 110 that is identical in shape to the plate-shaped workpiece 100 remains affixed to the plate-shaped workpiece 100. According to the first embodiment, the excess portion of the sheet 110 extends radially outwardly of the outer edge of the plate-shaped workpiece 100. The sheet cutting unit 24 is disposed upwardly of the holding surface 19 of the chuck table 10.

According to the first embodiment, as illustrated in FIG. 1, the sheet cutting unit 24 includes the cutter blade 62, referred to above, and a moving mechanism 63. The cutting edge 66 of the cutter blade 62 has a predetermined vertical length much larger than the thickness of the sheet 110 supplied onto the holding surface 19 of the chuck table 10. The cutting edge 66 vertically faces the sheet 110 on the holding surface 19 and a portion of the annular groove defined in the upper surface of the frame 11. The cutting edge 66 is inclined to the Z-axis directions to extend in a direction facing the surface of the base layer of the sheet 110 supplied onto the holding surface 19 of the chuck table 10.

The moving mechanism 63 moves the cutter blade 62 along the surface of the base layer of the sheet 110 on the holding surface 19. The moving mechanism 63 is also able to move the cutter blade 62 vertically in the Z-axis directions and to turn the cutter blade 62 circumferentially around the plate-shaped workpiece 100 about a vertical axis parallel to the Z-axis directions. The moving mechanism 63 includes a rotational shaft 61 disposed in alignment with the center of the holding surface 19 of the chuck table 10 and rotatable about its central axis by a rotary actuator such as an electric motor, not illustrated, an arm 64 extending radially outwardly from the rotational shaft 61 parallel to the holding surface 19 of the chuck table 10 and supporting the cutter blade 62 on a radially outer end thereof, and an air cylinder 65 for vertically moving, i.e., lifting and lowering, the arm 64 together with the rotational shaft 61.

The sheet take-up unit 25 winds up thereon an unwanted scrap portion of the sheet 110 after the portion of the sheet 110 affixed to the plate-shaped workpiece 100 has been severed off the remainder of the sheet 110. According to the first embodiment, the sheet take-up unit 25 is disposed in a position opposite the uncoiler unit 21 across the chuck table 10 along the X-axis directions, i.e., in a position on one side of the chuck table 10 in one of the X-axis directions away from the uncoiler unit 21. The sheet take-up unit 25 is disposed upwardly of the chuck table 10. The sheet take-up unit 25 is of a cylindrical shape whose central axis extends parallel to Y-axis directions, and is rotatable about its central axis by a rotary actuator such as an electric motor, not illustrated, to wind the unwanted scrap portion of the sheet 110 on its outer circumferential surface.

The feed rollers 26 are disposed between the uncoiler unit 21 and the sheet take-up unit 25. The feed rollers 26 feed the sheet 110 from the uncoiler unit 21 to the sheet take-up unit 25 and applies tension to the sheet 110 to prevent the sheet 110 from slackening. Each of the feed rollers 26 is of a cylindrical shape whose central axis extends parallel to Y-axis directions, and is rotatable about its central axis by a rotary actuator such as an electric motor, not illustrated.

The feed rollers 26 include a first pair of feed rollers 26 disposed between the uncoiler unit 21 and the chuck table 10 and below the uncoiler unit 21. The sheet 110 with the peel-off sheet 111 affixed to the sticky layer thereof is unwound from the uncoiler unit 21. When the sheet 110 with the peel-off sheet 111 passes between outer circumferential surfaces of the feed rollers 26 of the first pair, the peel-off sheet 111 is peeled off from the sheet 110 and is then delivered from the feed rollers 26 of the first pair to the peel-off sheet take-up unit 22 and wound thereon. The sheet 110 from which the peel-off sheet 111 has been peeled off is delivered toward the chuck table 10 with the sticky layer facing downwardly.

The feed rollers 26 also include a second pair of feed rollers 26 disposed between the first pair of feed rollers 26 and the chuck table 10. The sheet 110 delivered from the first pair of feed rollers 26 passes between outer circumferential surfaces of the feed rollers 26 of the second pair, and travels over the holding surface 19 of the chuck table 10 parallel to the holding surface 19 in one of the X-axis directions.

The feed rollers 26 further include a third pair of feed rollers 26 disposed between the chuck table 10 and the sheet take-up unit 25 and below the sheet take-up unit 25. The sheet 110 delivered from the second pair of the feed rollers 26 passes between outer circumferential surfaces of the feed rollers 26 of the third pair, and travels toward the sheet take-up unit 25.

The delivery unit 30 removes an unprocessed plate-shaped workpiece 100, which is to be processed by the processing unit 20, from a cassette, not illustrated, placed on a cassette rest, not illustrated, and delivers the unprocessed plate-shaped workpiece 100 onto the holding surface 19 of the chuck table 10. The delivery unit 30 also delivers a plate-shaped workpiece 100 that has been processed by the processing unit 20 from the holding surface 19, and places the processed plate-shaped workpiece 100 back into the cassette on the cassette rest. The delivery unit 30 is controlled by the control unit 40 and outputs, to the control unit 40, information indicating that it has delivered the unprocessed plate-shaped workpiece 100 onto the holding surface 19 or information indicating that it has delivered the processed plate-shaped workpiece 100 from the holding surface 19. According to the first embodiment, the delivery unit 30 is a robotic pickup mechanism having a circular hand, for example. The delivery unit 30 holds the plate-shaped workpiece 100 under suction with the circular hand and delivers the plate-shaped workpiece 100 thus held. According to the present invention, the delivery unit 30 is not limited to such a robotic pickup mechanism and may be a non-contact pickup mechanism having a lower surface functioning as a holding surface for holding the plate-shaped workpiece 100 under a negative pressure developed on the holding surface by a stream of air ejected along the holding surface according to the Bernoulli's principle.

The control unit 40 controls operation of various components of the processing apparatus 1 to enable the processing apparatus 1 to process the plate-shaped workpiece 100 with the processing unit 20. According to the first embodiment, the control unit 40 includes a computer system. The computer system includes an arithmetic processing device having a microprocessor such as a central processing unit (CPU), a storage device having a memory such as a read only memory (ROM) or a random access memory (RAM), and an input/output interface device. The arithmetic processing device of the control unit 40 carries out arithmetic processing operations according to computer programs stored in the storage device of the control unit 40, and outputs control signals for controlling the processing apparatus 1, through the input/output interface device of the control unit 40 to the components of the processing apparatus 1.

Operation of the processing apparatus 1 will be described below. The delivery unit 30 delivers one at a time of unprocessed plate-shaped workpieces 100 stored in the cassette on the cassette rest onto the holding surface 19 of the chuck table 10. The processing unit 20 processes the plate-shaped workpiece 100 on the holding surface 19. The delivery unit 30 then delivers the processed plate-shaped workpiece 100 from the holding surface 19 of the chuck table 10 and places the processed plate-shaped workpiece 100 back into the cassette.

When the delivery unit 30 has delivered the unprocessed plate-shaped workpiece 100 onto the holding surface 19 of the chuck table 10, the control unit 40 acquires information indicating that the delivery unit 30 has delivered the unprocessed plate-shaped workpiece 100 onto the holding surface 19 from the delivery unit 30, thereby recognizing that the unprocessed plate-shaped workpiece 100 is placed on the holding surface 19. When the control unit 40 recognizes that the unprocessed plate-shaped workpiece 100 is placed on the holding surface 19, the control unit 40 opens the on/off valve 14 (see FIG. 2) to transmit the negative pressure from the suction source 15 via the vacuum suction channel 13 to the holding surface 19, and closes the on/off valve 17 to stop supplying the gas 201 from the gas supply source 18 via the gas ejection channel 16 to the holding surface 19, whereupon the unprocessed plate-shaped workpiece 100 is held under suction on the holding surface 19 by the negative pressure applied to the holding surface 19.

When the delivery unit 30 has delivered the processed plate-shaped workpiece 100 from the holding surface 19 of the chuck table 10, the control unit 40 acquires information indicating that the delivery unit 30 has delivered the processed plate-shaped workpiece 100 from the holding surface 19, thereby recognizing that no plate-shaped workpiece 100 is placed on the holding surface 19. When the control unit 40 recognizes that no plate-shaped workpiece 100 is placed on the holding surface 19, the control unit 40 closes the on/off valve 14 (see FIG. 3) to stop transmitting the negative pressure from the suction source 15 via the vacuum suction channel 13 to the holding surface 19, and opens the on/off valve 17 to supply the gas 201 from the gas supply source 18 via the gas ejection channel 16 to the holding surface 19, whereupon the gas 201 is ejected upwardly from the holding surface 19 to form a protective film of the gas 201 over the holding surface 19, thereby preventing foreign matter from being deposited on the holding surface 19.

According to the first embodiment, the control unit 40 recognizes whether or not the plate-shaped workpiece 100 is placed on the holding surface 19 of the chuck table 10, on the basis of the information from the delivery unit 30 indicating whether the delivery unit 30 has delivered the plate-shaped workpiece 100 onto or from the holding surface 19. However, the present invention is not limited to such details. According to the present invention, the control unit 40 may recognize whether or not the plate-shaped workpiece 100 is placed on the holding surface 19 of the chuck table 10, on the basis of an output signal from a detector disposed on or around the chuck table 10, the detector being for detecting whether or not the plate-shaped workpiece 100 is placed on the holding surface 19.

The processing apparatus 1 according to the first embodiment is advantageous in that it requires no additional cleaning unit for cleaning the chuck table 10 and is able to protect the holding surface 19 against the deposition of foreign matter thereon with the protective film of the gas 201 formed over the holding surface 19 by the gas 201 ejected upwardly from the holding surface 19 when no plate-shaped workpiece 100 is placed on the holding surface 19. In particular, a conventional processing apparatus having a mechanism for ejecting a gas to the holding surface 19 to release the processed plate-shaped workpiece 100 easily from the holding surface 19 can have a function to protect the holding surface 19 against the deposition of foreign matter thereon according to the first embodiment, by incorporating an additional control mechanism for selectively performing, under the control of the control unit 40, the holding of the plate-shaped workpiece 100 under suction on the holding surface 19 and the ejecting of the gas 201 upwardly from the holding surface 19.

Heretofore, in a case where the processing unit is a sheet affixing unit having an affixing roller, when the affixing unit affixes a sheet to a plate-shaped workpiece on the holding surface of the chuck table, the affixing roller presses the plate-shaped workpiece in a thicknesswise direction thereof. Consequently, if foreign matter is deposited on the holding surface, then the foreign matter is highly likely to be deposited on the surface of the plate-shaped workpiece or to cause damage to the plate-shaped workpiece when it is pressed. The processing apparatus 1 according to the first embodiment where the processing unit 20 is a sheet affixing unit is advantageous in that it can reduce or eliminate the possibility that foreign matter will be deposited on the surface of the plate-shaped workpiece 100 or will cause damage to the plate-shaped workpiece 100 when it is pressed, because the processing apparatus 1 is able to prevent foreign matter from being deposited on the holding surface 19.

Second Embodiment

Figure 4:
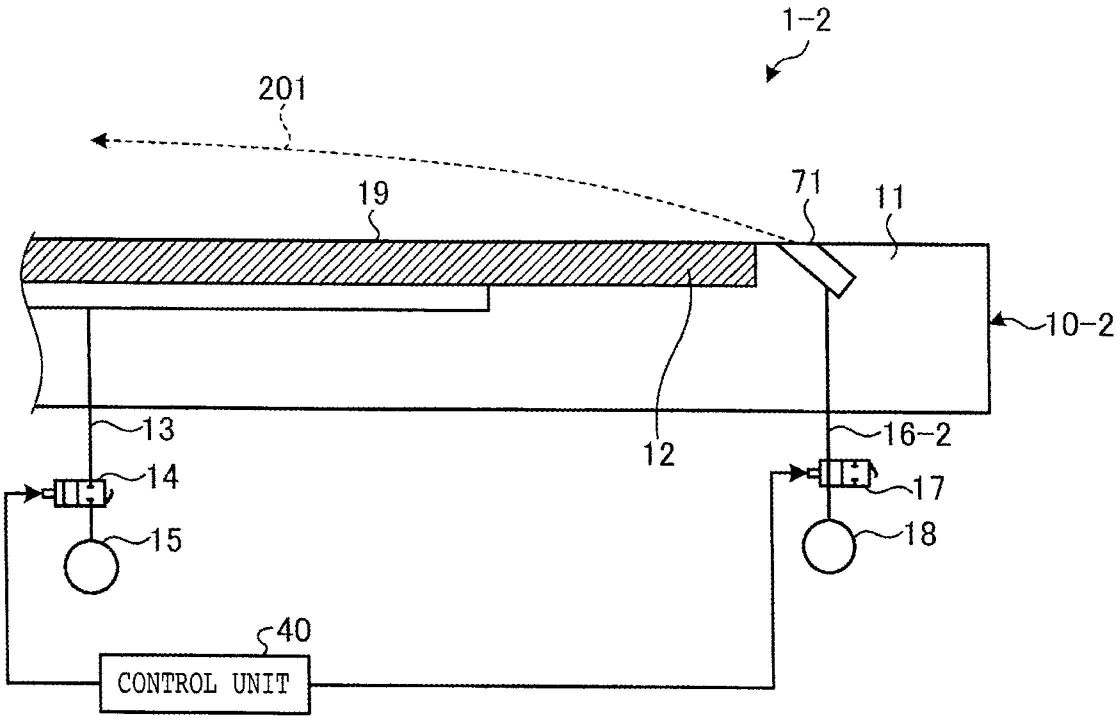
FIG. 4 is a fragmentary cross-sectional view illustrating a central portion of a processing apparatus according to a second embodiment of the present invention.

A processing apparatus 1-2 according to a second embodiment of the present invention will be described hereinbelow with reference to FIG. 4. FIG. 4 illustrates in fragmentary cross section a central portion of the processing apparatus 1-2 according to the second embodiment. In FIG. 4, those parts that are identical to those according to the first embodiment are denoted by identical reference characters, and will be omitted from description.

As illustrated in FIG. 4, the processing apparatus 1-2 according to the second embodiment is different from the processing apparatus 1 according to the first embodiment in that it further includes a gas ejection port 71 and includes a gas ejection channel 16-2 instead of the gas ejection channel 16. Other details of the processing apparatus 1-2 are similar to those of the processing apparatus 1 according to the first embodiment. The gas ejection port 71 is defined in the frame 11 of a chuck table 10-2 around the holding surface 19, i.e., radially outwardly of the holding surface 19, or more specifically, radially outwardly of the annular groove defined in the upper surface of the frame 11. The gas ejection port 71 is oriented radially inwardly with respect to the chuck table 10-2 to eject the gas 201 in a radially inward direction of the chuck table 10-2 toward a region over the chuck table 10-2. The gas ejection channel 16-2 extends in the frame 11 at a position radially outward of the annular groove defined in the upper surface of the frame 11. The gas ejection port 71 is fluidly connected to the gas supply source 18 through the gas ejection channel 16-2 and the on/off valve 17.

When the control unit 40 of the processing apparatus 1-2 recognizes that no plate-shaped workpiece 100 is placed on the holding surface 19, the control unit 40 closes the on/off valve 14 (see FIG. 4) to stop transmitting the negative pressure from the suction source 15 via the vacuum suction channel 13 to the holding surface 19, and opens the on/off valve 17 to supply the gas 201 from the gas supply source 18 via the gas ejection channel 16-2 to the gas ejection port 71, whereupon the gas 201 is ejected from the gas ejection port 71 to form a protective film of the gas 201 over the holding surface 19, thereby preventing foreign matter from being deposited on the holding surface 19.

The processing apparatus 1-2 according to the second embodiment ejects the gas 201, which is supplied from the gas supply source 18 via the gas ejection channel 16-2, from the gas ejection port 71 defined in the frame 11 radially outwardly of the holding surface 19 toward the region over the holding surface 19, thereby forming a protective film of the gas 201 over the holding surface 19, instead of ejecting the gas 201, which is supplied from the gas supply source 18 via the gas ejection channel 16, upwardly from the holding surface 19 according to the first embodiment. Consequently, the processing apparatus 1-2 according to the second embodiment offers similar advantages to those of the processing apparatus 1 according to the first embodiment.

The present invention is not limited to the first and second embodiments described above. Various changes and modifications may be made therein without departing from the scope of the invention. For example, the sheet 110 to be affixed to the plate-shaped workpiece 100 may be a sheet of thermoplastic resin free of a sticky layer. The sheet 110 that is a sheet of thermoplastic resin free of a sticky layer can be affixed to the plate-shaped workpiece 100 when it is pressure-bonded to the plate-shaped workpiece 100 while being heated.

The present invention is not limited to the details of the above described preferred embodiments. The scope of the invention is defined by the appended claims and all changes and modifications as fall within the equivalence of the scope of the claims are therefore to be embraced by the invention.

What is claimed is:

1. A processing apparatus comprising:

a chuck table having a holding surface for holding a plate-shaped workpiece thereon;

a processing unit for processing the plate-shaped workpiece held on the chuck table;

a delivery unit for selectively delivering the plate-shaped workpiece onto and from the chuck table; and a control unit for controlling the chuck table, the processing unit, and the delivery unit, wherein the chuck table includes a gas ejection channel fluidly connected to the holding surface and connected to a gas supply system, and while the plate-shaped workpiece is not placed on the holding surface, the control unit controls the gas supply system to eject a gas through the gas ejection channel and into the holding surface to form a protective layer of the gas over the holding surface, thereby preventing foreign matter from being deposited on the holding surface, and wherein the control unit is configured and arranged to recognize whether or not the plate-shaped workpiece is placed on the holding surface on the basis of information received from the delivery unit indicating whether the delivery unit has delivered the plate shaped workpiece onto or from the holding surface, and when the control unit recognizes that the plate-shaped workpiece is not placed on the holding surface, the control unit controls the gas supply system to eject the gas through the gas ejection channel and into the holding surface.

2. The processing apparatus according to claim 1, wherein the processing unit is a sheet affixing unit for affixing a sheet to the plate-shaped workpiece held on the chuck table.

3. The processing apparatus according to claim 1, further comprising:

a first on/off valve configured and arranged for controlling compressed gas being supplied to the gas ejection channel; and a second on/off valve configured and arranged for controlling negative pressure from a suction source being supplied to the holding surface for holding the workpiece thereon, wherein when the control unit receives information that no workpiece is placed on the holding surface, the control unit:

closes the second on/off valve to stop transmitting negative pressure from the suction source to the holding surface, and opens the first on/off valve to supply compressed gas to the gas ejection channel to thereby form the protective layer of the gas over the holding surface.

4. The processing apparatus according to claim 1, wherein the holding surface of the chuck table is made of a porous material.

5. The processing apparatus according to claim 4, wherein the gas ejected through the gas ejection channel, as controlled by the control unit, is ejected into the porous material of the holding surface to form the protective layer of the gas over the holding surface.

6. A processing apparatus comprising:

a chuck table having a holding surface for holding a plate-shaped workpiece thereon, wherein the holding surface includes a plurality of gas ejection holes therein;

a detector associated with the chuck table, wherein the detector is configured and arranged to send an output signal about whether or not the plate-shaped workpiece is placed on the holding surface of the chuck table;

a processing unit for processing the plate-shaped workpiece held on the chuck table;

a delivery unit for selectively delivering the plate-shaped workpiece onto and from the chuck table; and a control unit for controlling the chuck table, the processing unit, and the delivery unit, wherein the chuck table includes a gas ejection channel fluidly connected to the gas ejection holes of the holding surface and to a gas supply system, and while the plate-shaped workpiece is not placed on the holding surface, the control unit controls the gas supply system to eject a gas from the gas ejection holes to form a protective layer of the gas over the holding surface, thereby preventing foreign matter from being deposited on the holding surface, and wherein the control unit is configured and arranged to recognize whether or not the plate-shaped workpiece is placed on the holding surface on the basis of the output signal received from the detector, and when the control unit recognizes that the plate-shaped workpiece is not placed on the holding surface, the control unit controls the gas supply system to eject the gas through the gas ejection channel and into the holding surface.

7. The processing apparatus according to claim 6, wherein the processing unit is a sheet affixing unit for affixing a sheet to the plate-shaped workpiece held on the chuck table.

8. The processing apparatus according to claim 6, further comprising:

a first on/off valve configured and arranged for controlling compressed gas being supplied to the gas ejection channel; and a second on/off valve configured and arranged for controlling negative pressure from a suction source being supplied to the holding surface for holding the workpiece thereon, wherein when the control unit receives information that no workpiece is placed on the holding surface, the control unit:

closes the second on/off valve to stop transmitting negative pressure from the suction source to the holding surface, and opens the first on/off valve to supply compressed gas to the gas ejection channel to thereby form the protective layer of the gas over the holding surface.

* * * * *